US012649233B1

(12) United States Patent
Watson et al.

(10) Patent No.: US 12,649,233 B1
(45) Date of Patent: Jun. 9, 2026

(54) SYSTEM AND METHODS FOR ROBOTIC GRASPING

(71) Applicant: United States of America as represented by the Administrator of NASA, Washington, DC (US)

(72) Inventors: William A. Watson, Houston, TX (US); Orlando E. Gordillo, Houston, TX (US); Brady T. Campbell, Houston, TX (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 607 days.

(21) Appl. No.: 18/065,856

(22) Filed: Dec. 14, 2022

Related U.S. Application Data

(60) Provisional application No. 63/364,080, filed on May 3, 2022, provisional application No. 63/364,019, filed on May 2, 2022.

(51) Int. Cl.
B25J 9/16 (2006.01)

(52) U.S. Cl.
CPC ........... B25J 9/1664 (2013.01); B25J 9/1697 (2013.01)

(58) Field of Classification Search
CPC .................. B25J 9/1664; B25J 9/1697; G06T 2207/10016; G06T 7/12; G06T 7/246; G06T 7/13; G06T 7/33; G06T 7/60; G06T 2207/20076; G06T 7/593; G06T 2200/04; G06T 17/00; G06T 7/00;
(Continued)

(56) References Cited

U.S. PATENT DOCUMENTS

| | | | |
|---|---|---|---|
| 10,013,640 | B1 | 7/2018 | Angelova et al. |
| 10,207,402 | B2 | 2/2019 | Levine et al. |

(Continued)

OTHER PUBLICATIONS

Chiun-Hong Chien and K. Baker, "Pose estimation for servicing of orbital replacement units in a cluttered enironment," IEEE International Conference on Robotics and Automation, 2004. Proceedings. ICRA '04. 2004, New Orleans, LA, USA, 2004, pp. 5141-5146, doi: 10.1109/ROBOT.2004.1302533. (Year: 2004).*

(Continued)

*Primary Examiner* — Khoi H Tran
*Assistant Examiner* — Trang Dang
(74) *Attorney, Agent, or Firm* — David G. Matthews; Kurt G. Hammerle

(57) ABSTRACT

A robotic grasping system includes an end effector, a camera configured to capture a feed, a gripper mechanism, and a computing system configured to receive the feed from the camera and to perform operations based at least partially upon the feed. The operations include identifying a target object on a payload in the feed. The operations also include identifying a final position within a bounding box in which to search for the target object. The operations also include assigning locations of features at the final position in the bounding box of the feed. The operations also include identifying a pose of the end effector with respect to the final position based at least partially upon the locations of the features. The operations also include determining a translation to move the end effector from the final position into a grasping envelope that is in alignment with the target object.

13 Claims, 10 Drawing Sheets

(58) Field of Classification Search

CPC ........... G06T 2207/30244; G06T 7/174; G06T 7/215; G06V 10/82; G06V 30/10; G06V 10/764; G06V 40/172; G06V 40/161; G06V 10/44; G06V 10/255; G06V 10/7715; G06V 40/1365; G06V 20/695; G06V 10/40; G06V 10/20; G06V 40/162; G06V 10/245; G06V 10/761; G06V 10/757; G06V 20/698; G06V 2201/07; G06V 20/80; G06V 20/647

See application file for complete search history.

(56) References Cited

U.S. PATENT DOCUMENTS

| | | |
|---|---|---|
| 10,639,792 B2 | 5/2020 | Vijayanarasimhan et al. |
| 10,937,189 B2 | 3/2021 | Li et al. |
| 10,946,515 B2 | 3/2021 | Levine et al. |
| 11,004,230 B2 | 5/2021 | Pollefeys et al. |
| 11,034,018 B2 | 6/2021 | Kusano et al. |
| 11,045,949 B2 | 6/2021 | Vijayanarasimhan et al. |
| 11,151,405 B1 | 10/2021 | Hoffmann |
| 11,273,552 B2 | 3/2022 | Ku et al. |
| 11,295,475 B2 | 4/2022 | Kalra et al. |
| 11,440,685 B2 | 9/2022 | Goff et al. |
| 2013/0195365 A1* | 8/2013 | Van Beek ............ G06V 10/757 |
| | | 382/199 |
| 2018/0071032 A1 | 3/2018 | de Almeida Barreto |
| 2019/0168395 A1 | 6/2019 | Hay et al. |
| 2019/0241286 A1* | 8/2019 | Goff ......................... B64G 1/66 |
| 2020/0167905 A1* | 5/2020 | Bian ...................... G01N 21/91 |
| 2021/0237281 A1 | 8/2021 | Hay et al. |
| 2021/0312655 A1 | 10/2021 | Tang et al. |
| 2022/0318942 A1* | 10/2022 | Oda ......................... B25J 9/163 |
| 2022/0355692 A1* | 11/2022 | Hetrich ................... B60L 53/14 |

OTHER PUBLICATIONS

Chien et al., Pose Estimation For Servicing of Orbital Replacement Units in a Cluttered Environment, Proceedings of the 2004 IEEE International Conference on Robotics & Automation, New Orleans, LA, Apr. 2004, pp. 5141-5416.

Lucier et al., International Space Station (ISS) Robotics Development Operations Team Results in Robotic Remote Sensing, Control, and Semi-Automated Ground Control Techniques, 16th International Conference on Space Operations, Cape Town, South Africa, May 3-5, 2021, SpaceOps-2021,3,x1280, 17 pages.

Author Unknown, Spaceops 2021 Virtual Edition, The 16th International Conference on Space Operations, May 3-5, 2021, Conference Programme, 52 pages.

* cited by examiner

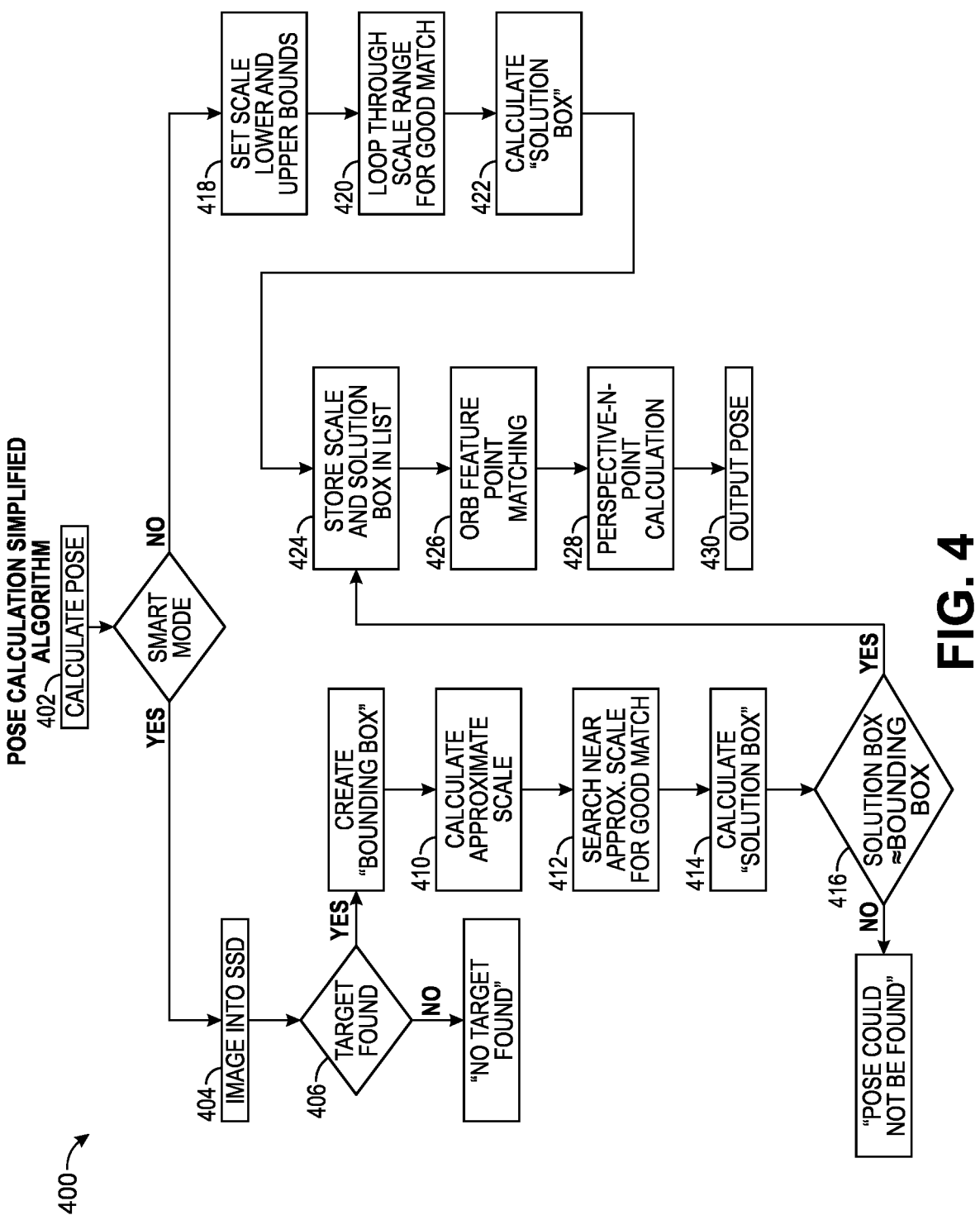

POSE CALCULATION SIMPLIFIED ALGORITHM

402 CALCULATE POSE

406 SMART MODE

404 IMAGE INTO SSD

406 TARGET FOUND

"NO TARGET FOUND"

410 CREATE "BOUNDING BOX"

CALCULATE APPROXIMATE SCALE

412 SEARCH NEAR APPROX. SCALE FOR GOOD MATCH

414 CALCULATE "SOLUTION BOX"

416 SOLUTION BOX ≈ BOUNDING BOX

"POSE COULD NOT BE FOUND"

418 SET SCALE LOWER AND UPPER BOUNDS

420 LOOP THROUGH SCALE RANGE FOR GOOD MATCH

422 CALCULATE "SOLUTION BOX"

424 STORE SCALE AND SOLUTION BOX IN LIST

426 ORB FEATURE POINT MATCHING

428 PERSPECTIVE-N-POINT CALCULATION

430 OUTPUT POSE

Input

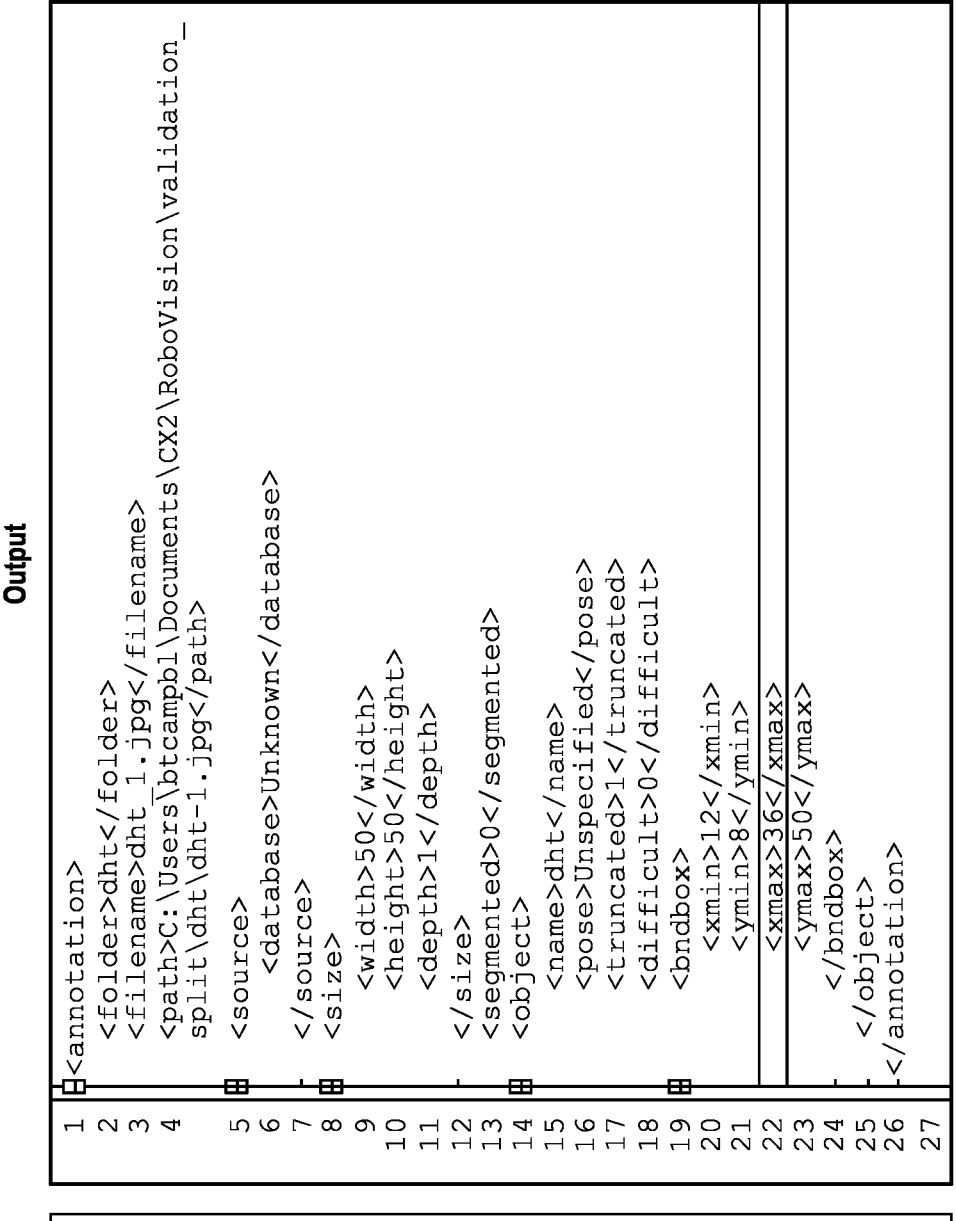

160

Output

```
1  <annotation>
2    <folder>dht</folder>
3    <filename>dht_1.jpg</filename>
4    <path>C:\Users\btcampbl\Documents\CX2\RoboVision\validation_
       split\dht\dht-1.jpg</path>
5    <source>
6      <database>Unknown</database>
7    </source>
8    <size>
9      <width>50</width>
10     <height>50</height>
11     <depth>1</depth>
12   </size>
13   <segmented>0</segmented>
14   <object>
15     <name>dht</name>
16     <pose>Unspecified</pose>
17     <truncated>1</truncated>
18     <difficult>0</difficult>
19     <bndbox>
20       <xmin>12</xmin>
21       <ymin>8</ymin>
22       <xmax>36</xmax>
23       <ymax>50</ymax>
24     </bndbox>
25   </object>
26 </annotation>
27
```

FIG. 5

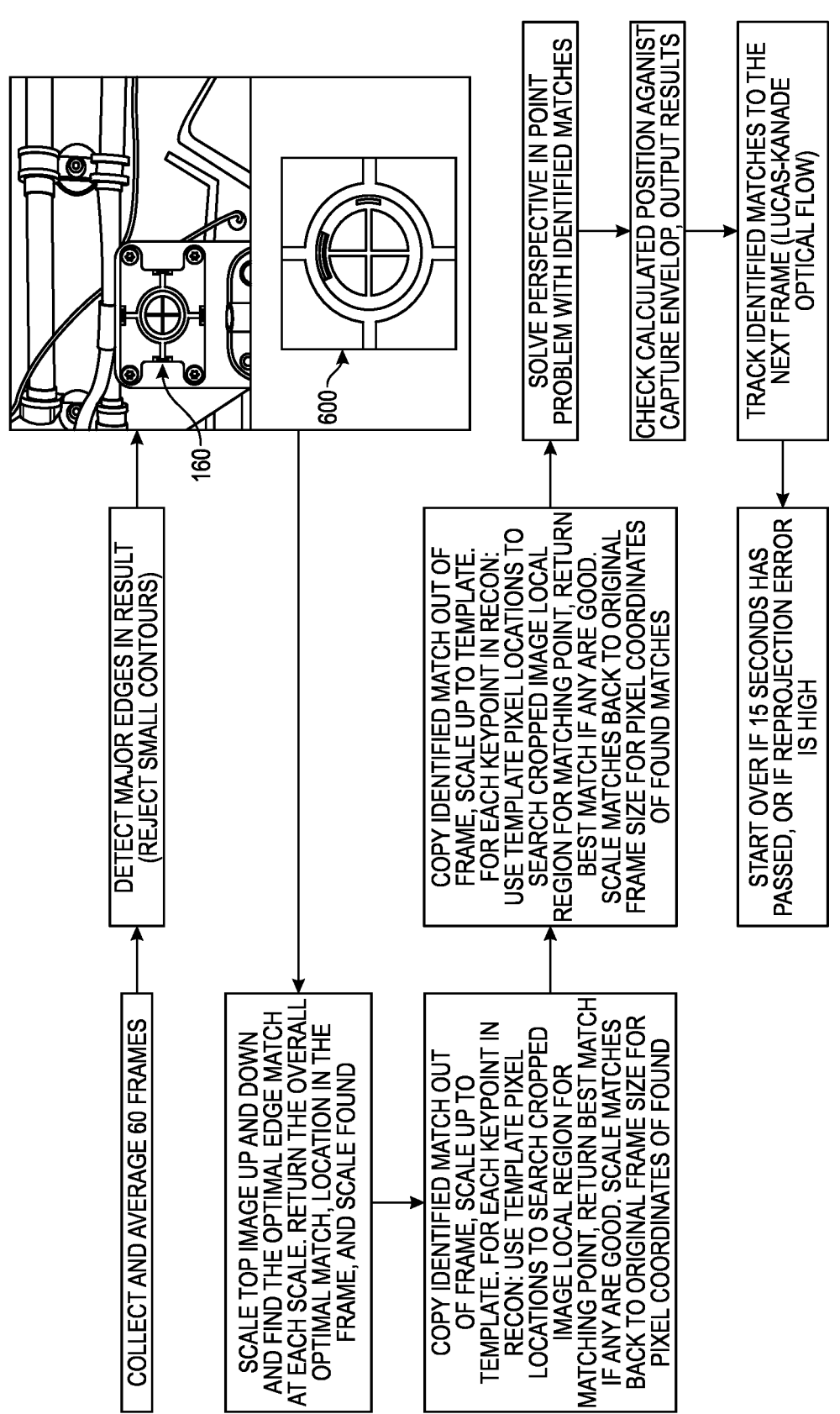

COLLECT AND AVERAGE 60 FRAMES

DETECT MAJOR EDGES IN RESULT (REJECT SMALL CONTOURS)

160

600

SCALE TOP IMAGE UP AND DOWN AND FIND THE OPTIMAL EDGE MATCH AT EACH SCALE. RETURN THE OVERALL OPTIMAL MATCH, LOCATION IN THE FRAME, AND SCALE FOUND

COPY IDENTIFIED MATCH OUT OF FRAME, SCALE UP TO TEMPLATE. FOR EACH KEYPOINT IN RECON: USE TEMPLATE PIXEL LOCATIONS TO SEARCH CROPPED IMAGE LOCAL REGION FOR MATCHING POINT, RETURN BEST MATCH IF ANY ARE GOOD. SCALE MATCHES BACK TO ORIGINAL FRAME SIZE FOR PIXEL COORDINATES OF FOUND

COPY IDENTIFIED MATCH OUT OF FRAME, SCALE UP TO TEMPLATE. FOR EACH KEYPOINT IN RECON: USE TEMPLATE PIXEL LOCATIONS TO SEARCH CROPPED IMAGE LOCAL REGION FOR MATCHING POINT, RETURN BEST MATCH IF ANY ARE GOOD. SCALE MATCHES BACK TO ORIGINAL FRAME SIZE FOR PIXEL COORDINATES OF FOUND MATCHES

SOLVE PERSPECTIVE IN POINT PROBLEM WITH IDENTIFIED MATCHES

CHECK CALCULATED POSITION AGANIST CAPTURE ENVELOP, OUTPUT RESULTS

TRACK IDENTIFIED MATCHES TO THE NEXT FRAME (LUCAS-KANADE OPTICAL FLOW)

START OVER IF 15 SECONDS HAS PASSED, OR IF REPROJECTION ERROR IS HIGH

FIG. 8

SYSTEM AND METHODS FOR ROBOTIC GRASPING

CROSS-REFERENCE TO RELATED APPLICATIONS

This patent application claims priority to U.S. Provisional Patent Application No. 63/364,019, filed on May 2, 2022 and U.S. Provisional Patent Application No. 63/364,080, filed on May 3, 2022, the entirety of which are incorporated by reference herein.

STATEMENT OF GOVERNMENT INTEREST

The invention described herein was made by employee(s) of the United States Government and may be manufactured and used by or for the Government of the United States of America for governmental purposes without the payment of any royalties thereon or therefor.

BACKGROUND

Robotic flight controllers, such as those used on the International Space Station (ISS), make use of visual cues to determine and correct any offsets between a robot end effector and a fixture on a payload prior to attempting to grasp the fixture on the payload with the end effector. This is referred to as a grasp (or capture) operation. The act of correcting alignment is often iterative, taking about 5 minutes per position adjustment. This is time consuming because a "miscapture" may increase time to complete the grasp or capture operation (e.g., by about 25 minutes). Therefore, what is needed is an improved system and method for determining and correcting any offsets between the robot end effector and the payload's grasp fixture prior to attempting the grasp or capture operation.

SUMMARY

A robotic grasping system is disclosed. The robotic grasping system includes an end effector. The robotic grasping system also includes a camera coupled to the end effector and configured to capture a feed. The robotic grasping system also includes a gripper mechanism coupled to the end effector. The robotic grasping system also includes a computing system configured to receive the feed from the camera and to perform operations based at least partially upon the feed. The operations include identifying a target object on a payload in the feed. The operations also include identifying a final position within a bounding box in which to search for the target object. The operations also include assigning locations of features at the final position in the bounding box of the feed. The operations also include identifying a pose of the end effector with respect to the final position based at least partially upon the locations of the features. The operations also include determining a translation to move the end effector from the final position into a grasping envelope that is in alignment with the target object. The translation is based upon the pose. The operations also include moving the end effector into the grasping envelope based upon the translation. The operations also include grasping a grasping fixture on the payload with the gripper mechanism when the end effector is in the grasping envelope.

A method is also disclosed. The method includes receiving a feed from a camera on a robotic grasping system. The method also includes identifying a target object on a payload in the feed. The method also includes identifying a final position within a bounding box in which to search for the target object. The method also includes assigning pixel locations of orb features at the final position in the bounding box of the feed. The method also includes identifying a pose of the robotic grasping system with respect to the final position based at least partially upon the pixel locations. The method also includes determining a translation for the robotic grasping system to move the robotic grasping system from the final position into a grasping envelope that is in alignment with the target object. The translation is based upon the pose. The method also includes moving the robotic grasping system into the grasping envelope based upon the translation. The method also includes grasping a grasping fixture on the payload with the robotic grasping system.

A method for grasping a payload with a robotic grasping system is also disclosed. The method includes receiving a live video feed from a borescope camera on the robotic grasping system. The method also includes identifying a target object on the payload in the live video feed. Identifying the target object includes identifying a bounding box in the live video feed with a first level of precision, wherein the target object is within the bounding box, and classifying the target object using a single-shot multi-box detector. The method also includes identifying a final position within the bounding box in which to search for the target object with a second level of precision that is greater than the first level of precision. Identifying the final position includes selecting target-specific parameters, camera-specific parameters, and a template based upon the classification of the target object. The target-specific parameters include one or more points on the target object relative to a user-defined parameter. The camera-specific parameters include a field-of-view (FOV), a center pixel, distortion, or a combination thereof. The template includes an image where the one or more points on the target object are located relative to one another. Identifying the final position also includes identifying edges of the live video feed and edges of the template. Identifying the final position also includes scaling the live video feed to a plurality of different scales. Identifying the final position also includes comparing the template to a plurality of different portions of the live video feed at each of the different scales. Identifying the final position also includes selecting the scale and the portion of the live video feed where the edges of the live video feed are a closest match with edges of the template. The scale and the portion are used to identify the final position. The method also includes assigning pixel locations of orb features at the final position in the bounding box of the live video feed. The method also includes identifying a pose of the robotic grasping system with respect to the final position. Identifying the pose includes translating the pixel locations to three-dimensional coordinates, and determining a distance between a camera sensor in the borescope camera and the target object based upon the three-dimensional coordinates. The method also includes determining a translation for the robotic grasping system to move the robotic grasping system from the final position into a grasping envelope that is in alignment with the target object, wherein the translation is based upon the pose. The translation is determined with a certainty that is greater than a predetermined threshold. The translation is less than or equal to the distance. The translation is in a direction that is an inverse of the three-dimensional coordinates. The method also includes moving the robotic grasping system into the grasping envelope based upon the translation. The method also includes grasping a grasping fixture on the payload with the robotic grasping system. The grasping fixture is positioned below the target object.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 4 illustrates a flowchart of a method for determining a position pose between the robot grasping system and the payload, according to an embodiment.

FIG. 5 illustrates an input into a computing system and an output from the computing system, according to an embodiment.

FIG. 8 illustrates a flowchart of a method for performing pose estimation, according to an embodiment.

DETAILED DESCRIPTION

Figure 1:
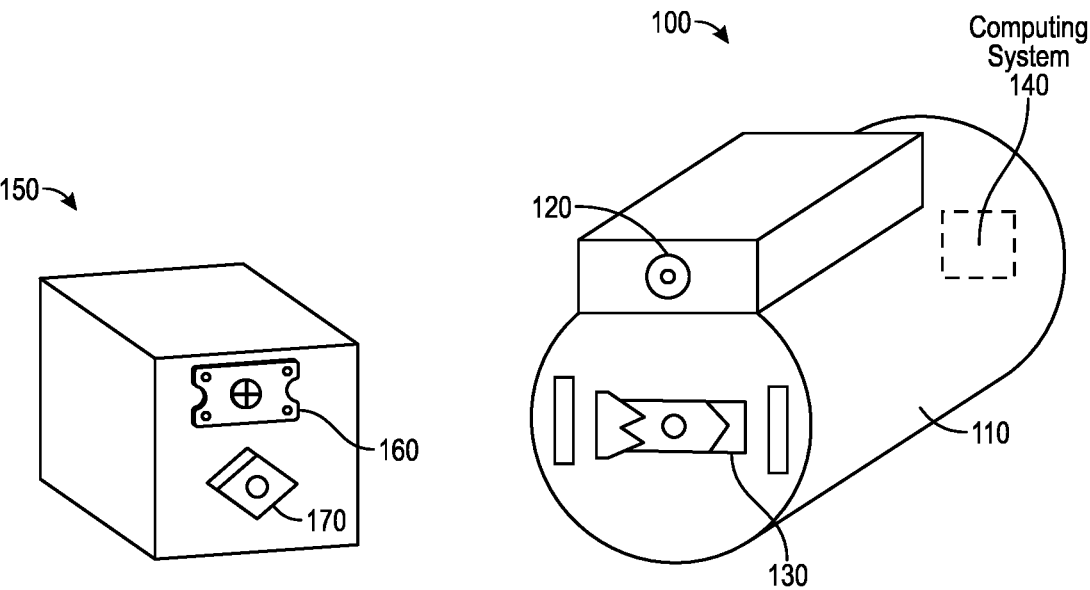
FIG. 1 illustrates a schematic view of a robot grasping system and a payload, according to an embodiment.

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art, now having the benefit of this detailed description, that other embodiments may be practiced without these specific details. In other instances, well-known methods, procedures, components, circuits, and networks have not been described in detail so as to assist in understanding aspects of the embodiments.

The system and method described herein may provide a robotic grasping system and method to identify a target object on a payload, move an end effector of the robotic grasping system, and grasp the target object using the end effector. More particularly, the robotic grasping system and method may use a camera to capture video of an environment having one or more target objects, process the video to identify at least one of the target objects, and determine an estimated location area of the target object(s). The robotic grasping system and method may then determine adjustment information based at least partially upon the estimated location area. The adjustment information may be used to move the end effector towards the target object from a first pose position to a second pose position so that the end effector is closer to (or in) a capture position where the end effector may be actuated to grasp a grasp fixture on the payload.

More specifically, the system and method may use machine vision to detect the target object, to determine a pose position of the end effector and the target object, and then position the end effector closer to the capture position based on the pose position and adjustment information. Multiple iterations of (1) estimating the pose position, (2) determining adjustment information using the video from the camera, and (3) positioning the end effector based on adjustment information may be performed to position the end effector in the capture pose position. Once in the capture pose position, a capture operation (also referred to as an attachment operation) may be performed. An example of the capture operation includes grasping the grasp fixture on the payload with the end effector.

The robotic grasping system and method may help to reduce the pose estimation time used to determine the pose position. The robotic grasping system and method may also help to determine the adjustment time used to move the end effector to the next pose position. Reducing pose estimation time is important because the target position of the target object may not be stationary with respect to the robot end effector. For example, the target object may be on a payload that is moving (e.g., due to thermal expansion and/or structure stresses). Thus, increasing the pose estimation time may increase the likelihood that the time for completing the gripping process will substantially increase, and the number of iterative target positions needed will increase.

The robotic grasping system and method may implement a machine-vision solution to reduce reliance on the "calibrated eye" of a user (e.g., an experienced flight controller) to estimate robot position corrections required to bring the end effector and the grasp fixture on the payload into alignment. The robotic grasping system and method may use a perspective-n-point solution, along with a simplified pin-hole camera model. For example, the perspective-n-point solution may determine the position of the end effector with respect to the target object based upon known and unknown parameters. An example of a known parameter is a distance between the camera and a distal end of the end effector. An example of an unknown parameter is distortion on the lens of the camera. The camera model represents a relationship between the coordinates of a point (e.g., on the target object) in 3D space and its projection onto an image on a plane.

The robotic grasping system and method may select an appropriate target template, which allows the machine-vision system to select one or more visual landmarks appropriate for the target type from within a cluttered image. This may be performed using key-point detection algorithms, which select mathematically-interesting corner points and/or descriptor vectors and allow the same points to be detected in different images of the same object.

The robotic grasping system and method may utilize a trained regional Convolutional Neural Network (r-CNN) to provide the capability to "watch video" for any of the fixture targets that may be in the operational environment. This machine learning (ML) upgrade may allow video to continue running at full speed while the neural network monitors for a known target type. Once observed, the camera and target parameters may be loaded. This feature may also be utilized to increase the operational range from a max of 0.5 meters for certain target types out to greater than 1.5 meters.

This model can also take the place of the object detection portion of an algorithm used in in the method responsible for finding the identified target object in the video scene. An object identification algorithm may be based on template matching across a range of image scales (e.g., representing depth). The robotic grasping system and method may identify highly-repeatable bounding boxes, at a computational cost of about 5-10 seconds. The ML model may be used to reduce this computational time by up to 10× or more with no impact to the resulting pose accuracy by blending the template match search and ML methods (e.g., to narrow the search window for the former). For example, the target object may be identified using a machine learning model running on the computing system. A localized search in which to search for the target object may be performed using the machine learning model, and the bounding box and the localized search may be blended to identify the final position.

An additional option which may sacrifice the accuracy uses the ML to define bounding boxes as-is, which provides up to a 50× speed boost to the object identification algorithm. A "watch video" function may be used to swap between speed/accuracy tradeoffs at the appropriate distance, calculating faster while farther from the target object, and taking more time to get a more accurate solution as the robot end effector approaches the payload.

FIG. 1 illustrates a schematic view of a robot grasping system 100 and a payload 150, according to an embodiment. The robot grasping system 100 may be or include an end effector 110. The robot grasping system 100 may also include a camera 120. The camera 120 may be coupled to the end effector 110. The camera 120 may be or include a borescope camera. The robot grasping system 100 may also include a gripper mechanism (e.g., gripper jaws) 130. The gripper mechanism 130 may be coupled to the end effector 110. The robot grasping system 100 may also include a computing system 140 that is in communication with the camera 120 and/or the gripper mechanism 130.

Examples of the payload 150 may be or include an earth surface mineral dust source investigation, a robotic refueling mission (RRM), a battery charge/discharge unit (BCDU), an on-orbit replacement unit (ORU), an arm computer unit (ACU), and/or a camera light assembly (CLA). The payload 150 may include a target object 160. The target object 160 may be or include a visual and/or structural portion of the payload 150 that is designed to be visually recognizable by the camera 120 and/or computing system 140. The payload 150 may also include a grasp fixture 170. The grasp fixture 170 may be or include a portion of the payload 150 that is designed to be grasped by the gripper mechanism 130. For example, the grasp fixture 170 may be or include a space station remote manipulator system (SSRMS), a special purpose dexterous manipulator (SPDM), a power data grapple fixture (PDGF), and/or a flight releasable attachment mechanism (FRAM). The grasp fixture 170 may be positioned below the target object 160.

As described in greater detail below, the camera 120 may be configured to capture a live feed of the payload 150. More particularly, the camera 120 may be configured to capture video and/or images of the target object 160 and/or the grasp fixture 170. The feed may be transmitted to the computing system 140. As described in greater detail below, the computing system 140 may cause the end effector 110 (e.g., the gripper mechanism 130) to move into alignment with the grasp fixture 170 and then cause the gripper mechanism 130 to grasp the grasp fixture 170 based at least partially upon the feed from the camera 120.

Figure 2:
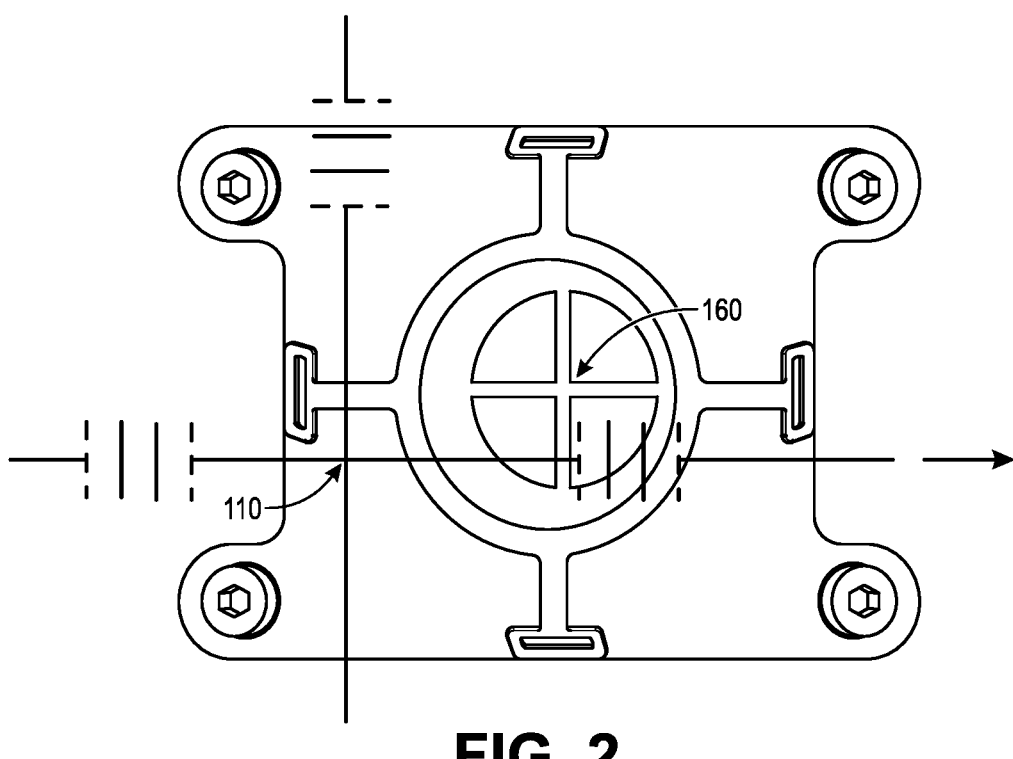
FIGS. 2 and 3 illustrate images of an end effector of the robot grasping system overlying a target object on the payload, according to an embodiment.
Figure 3:
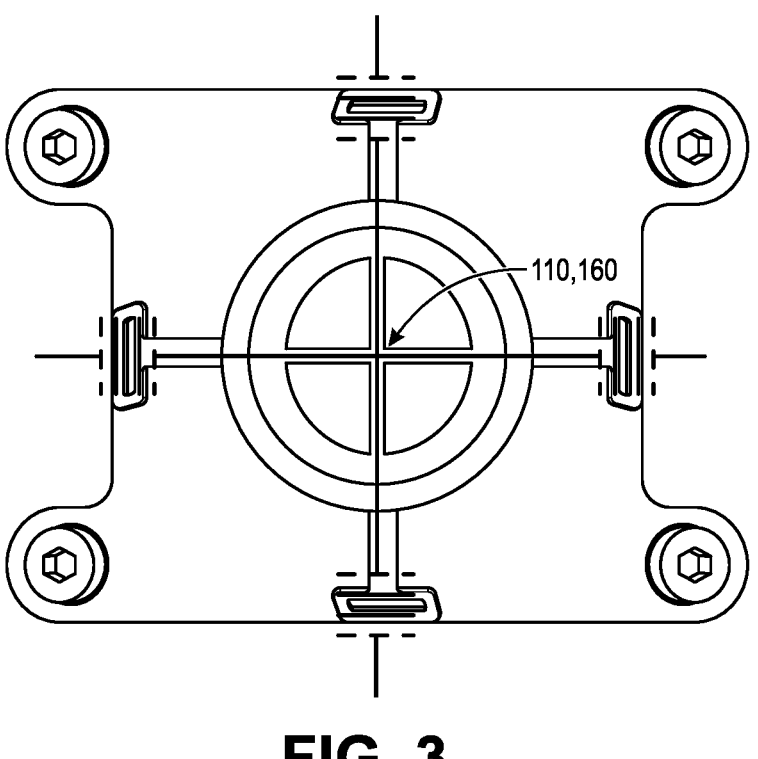

FIGS. 2 and 3 illustrate images of the end effector 110 overlying the target object 160, according to an embodiment. The images may be based upon the feed captured by the camera 120. The relative position between the end effector 110 (e.g., the gripper mechanism 130) and the payload 150 (e.g., the target object 160 and/or grasp fixture 170) may be referred to as a pose position.

In FIG. 2, the end effector 110 (represented by the cross hairs) is shown off-center (e.g., misaligned) from the target object 160. More particularly, a static camera overlay corresponding to the position of the end effector 110 and/or the camera 120 is shown off-center from the target object 160. During a robotic grasping operation, the robot grasping system 100 may be configured to move the end effector 110 from a first (e.g., misaligned) pose position where the gripper mechanism 130 is not positioned to grasp the grasp fixture 170 to a second (e.g., aligned and/or capture) pose position (e.g., the grasp envelope) where the gripper mechanism 130 is aligned with and configured to grasp the grasp fixture 170 with a likelihood/certainty that is greater than a predetermined threshold.

In FIG. 3, the end effector 110 is in the capture pose position. More particularly, the static camera overlay depicts the end effector 110 and/or the camera 120 being centered over the target object 160. The computing system 140 (and/or the display screen thereof) may provide a visual or audio alert depicting that the end effector 110 is in the capture pose position.

FIG. 4 illustrates a flowchart of a method 400 for determining a position pose (e.g., between the end effector 110 and the payload 150), according to an embodiment. One or more steps of the method 400 may be performed by the end effector 110 and/or the computing system 140. The method 400 may include determining the position of the end effector 110 relative to the target object 160 on the payload 150, as at 402. In accordance with this embodiment, the method 400 may include a smart mode that may be selected. When selected, the smart mode may provide one or more images as an input to the computing system 140, as at 404. More particularly, the image(s) may be provided to a trained single shot multi-box detector (e.g., the machine learning model). The neural network may use one or more target object templates and/or environment information in the training of the neural network.

The method 400 may also include determining if within an output from the computing system 140, a vector including the probability of any of the trained target objects 160 is within the image(s), as at 406. The method 400 may also include creating bounding box coordinates around the target object 160 based upon the vector, as at 408. The method 400 may also include determining a scale of the target object 160 based upon a size of the bounding box, as at 410. This may determine the scale based upon the bounding box relative to the entire image. For example, if the bounding box is half of the size of the image, then the bounding box may be 0.5. The use of the neural network to determine the bounding box may be used to provide an improved bounding box having a reduced scale.

The method 400 may also include searching within the bounding box for a "best-fit" location of the target object 160 (e.g., if in 10× mode), as at 412. If in 50× mode, this step may be skipped. The method 400 may also include using the new "best-fit" box as a solution box, or using the bounding box that was provided with the SSD output as the solution box, as at 414. For example, the solution box may be calculated using the bottom left point and top right point of where the best match of target object 160 is found in the image. If the solution box found is not null (e.g., void or does not exist), and if it is within the bounding box, the continue to the next step, as at 416. Otherwise, the pose could not be found.

When not in the smart mode, determining the scale may include the bounding box having a lower bound and an upper bound, as at 418. For example, the lower bound may be 0.1 (e.g., 10%), and the upper bound may be 0.9 (e.g., 90%). The method 400 may also include looping through a plurality of different scales for a best match, as at 420. This may also be referred to as a cascading window search. The method 400 may also include calculating a solution box, as at 422. The solution box may be calculated based upon the best match of the scale(s). For example, the solution box may be calculated using the bottom left and top right point of where the best match of target object 160 is found in the image.

The method 400 may also include storing/recording the scale and/or location of the solution box found into a list, as at 424. The method 400 may also include searching for one or more orb features in the image(s), and attempting to match them to the orb feature(s) found in/on the respective target objects' template file(s) 160, as at 426. There is a possibility that, due to lighting or defects on the target object(s) 160, not enough orb features may be matched as expected, and the program may return a pose estimation failed message. The method 400 may also include determining 3-D (e.g., X-Y-Z) world coordinates based upon (u, v) pixel locations, scale, and camera parameters, as at 428. The method 400 may also include returning the output to the user, as at 430. The output may identify where in 3D space the end effector 110 is located relative to the target object 160 on the payload 150.

FIG. 5 illustrates an input into the computing system 140 and an output from the computing system 140, according to an embodiment. The input may be or include the feed (e.g., a video frame) from the camera 120. The computing system 140 may train the neural network by the processing the video frame to detect the target object 160 and/or to determine parameters of the bounding box. The output is in VOC XML format that describes the classification, size, and/or location (e.g., the bounding box) of the target object 160 in the video frame.

Figure 6:
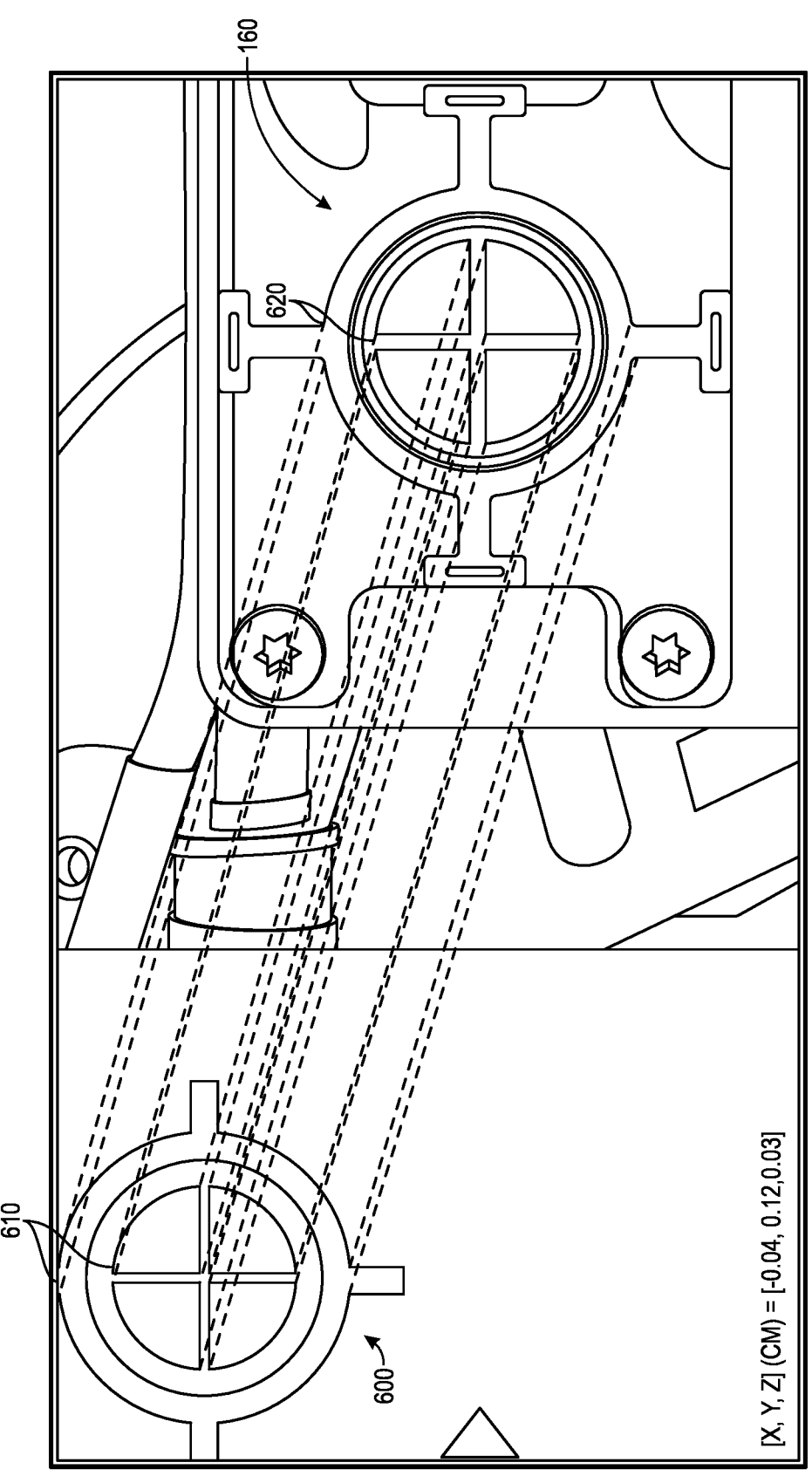
FIG. 6 illustrates a template of the target object, according to an embodiment.

FIG. 6 illustrates a template 600 of the target object 160, according to an embodiment. The template 600 may include one or more reference points 610 that are mapped to corresponding reference points 620 on the video frame of the (e.g., actual) target object 160 captured by the camera 120. Mapping of the reference points 610, 620 may be used to estimate the location of the target object 160 and/or a bounding box corresponding to an estimated area of the location of the target object 160. The coordinates on the bottom left represent the (e.g., inverse) position of the end effector 110 relative to the target object 160. The term inverse position refers to movement/translation that the end effector 110 would make to become aligned with the target object 160.

Figure 7B:
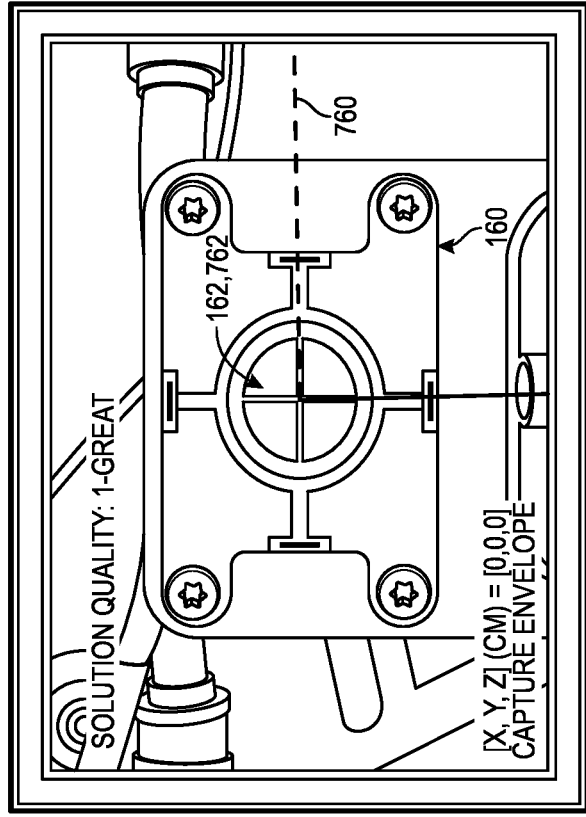
FIG. 7B illustrates a second image showing a second (e.g., capture) pose position, according to an embodiment.
Figure 7A:
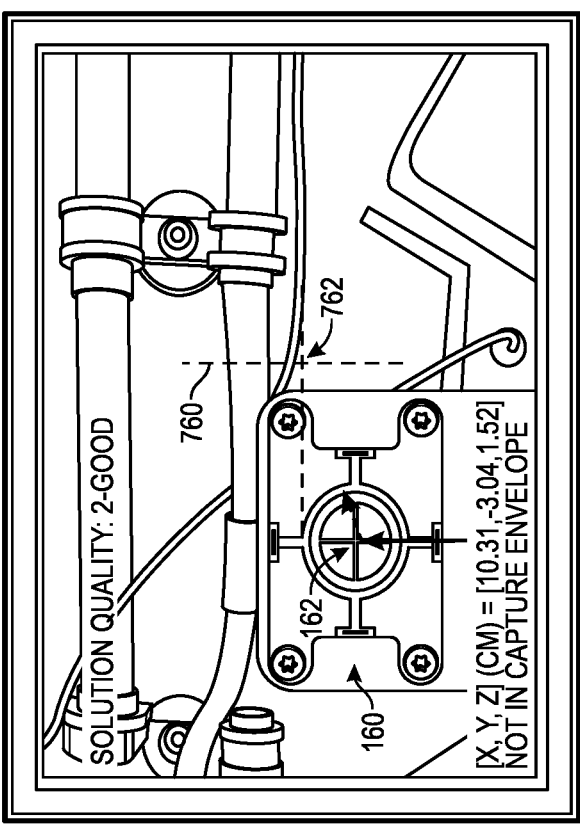
FIG. 7A illustrates a first image showing a first (e.g., misaligned) pose position.

FIG. 7A illustrates a first video frame (e.g., image) showing a first (e.g., misaligned) pose position, and FIG. 7B illustrates a second video frame showing a second (e.g., aligned/capture) pose position, according to an embodiment.

Indicia on the video frame in FIG. 7A show the end effector 110 is not in the capture pose position. Said another way, the pose position may be referred to as not in the capture envelope. Thus, the (e.g., center) 162 of the target object 160 is misaligned with a (e.g., center) 762 of an overlay 760. The overlay 760 provides visual cues of alignment with the end effector 110. The overlay 760 may be aligned with the camera 120 and/or the gripper mechanism 130.

The capture envelope refers to when the robot grasping system 100 is able to grasp the grasp fixture 170 successfully (e.g., not too deep and not too shallow). This may mean different things for the SSRMS and SPDM because the SSRMS wraps snare cables around a pin and retracts a carriage to rigidize the hold on the payload 150. In contrast, the SPDM grasps the fixture 170, which is prism-shaped, with its gripper jaws 130 that fit into those prism grooves. The SSRMS allows for more misalignment while remaining in the capture envelope. Position adjustments to move the end effector 110 to the capture position or capture envelope are shown in the video frame. More specifically, the bottom of the video frame in FIG. 7A shows adjustment amounts for adjusting the end effector 110 in space (e.g., for X, Y, and Z coordinates).

As mentioned above, FIG. 7B shows the end effector 110 after the end effector 110 has been moved based upon the adjustment amounts. Thus, the overlay 760 and the target object 160 are now in alignment. The end effector 110 in the capture position pose is in the capture envelope. Additional (e.g., iterative) measurements may be performed to confirm the alignment.

In one embodiment, the computing system 140 may run robotic grasping software that provides a Graphical User Interface (GUI) through which a user may stream live video of a single monocular borescope camera (e.g., camera 120). The computing system 140 may then use Region-Based Convolutional Neural Network (R-CNN) Single Shot Detector (SSD)-based object localization combined with custom template based search optimization to identify the pixel location of defined points recorded in a configuration file. The computing system 140 may then extract the 6 degree of freedom (DOF) pose of a robotic manipulator (e.g., end effector 110) with respect to a known target object 160 in the field of view within ~1 millimeter in less than 0.5 seconds.

The approach taken to extract a 3-D camera pose from a 2-D video frame (e.g., image) is the solve perspective-n-point problem. At a high level, this problem can be stated as recovering the pose from a set of correspondences between identified points in an image or stream of images and the 3-D coordinates of those points in a defined 3-D world frame. If a sufficient number of correct points can be identified in an image stream and correctly associated with their 3-D world coordinates, then perspective-n-point functions may be used to extract the pose information. This method may be based on the pinhole camera model, where for each of n points, the relationship between the identified pixel coordinate (u, v) and the associated world coordinate (X, Y, Z) is the intrinsic camera parameter matrix multiplied by the augmented matrix of rotation and translational parameters.

Recovering the pose information with computer vision may be reduced to accurately identifying specified points in a video feed of downlink video from the camera 120. The assumption implied is that there is a target object 160 in the video frame that has a known pattern that allows for the pre-definition of a finite number of target templates 600 with which to identify the point correspondences required. For the target object 160, the associated template 600 is compared. The points are selected ahead of time as the unique corners in the image. This template 600 points to a set of 3-D coordinates in a world frame defined at the target object's centroid. One or more of the known objects to be tracked by the software are trained using software and/or are based on user provided training data. This resultant model is trained offline on this example imagery and implemented in the system and method to provide object identification and rough location of any of the trained objects.

This process is quick enough to operate on live video (e.g., at least 30 FPS) without causing lag and to identify trained objects as soon as they are in the field of view. As soon as the known target object 160 is identified, the method initiates a finer custom localization algorithm to improve the reliability of bounding boxes drawn around the identified object 160, and the resultant repeatability of the pose estimation generated. The finer custom localization searches for the target object 160 within the bounding box at a scale between 0.6 and 1.4.

FIG. 8 illustrates a flowchart of a method for performing pose estimation, according to an embodiment. To identify the target object 160 in the cluttered space environment, the method developed may average 60 frames of downlink to reduce noise effects and then applies a robust edge finding function, discarding edge contours whose area is below a certain threshold (e.g., for further noise mitigation).

The user-selected or AI-auto-selected template 600 is also converted to black and white edges, and the target object's fine location may be identified by scaling the edge view averaged video frame up and down over a predefined range and convolving the template image 600 with the edged video in a bitwise "AND" manner across the full width and height of the video frame, at every scale. More particularly, the bits in the video frame are 0 or 1. Each bit represents a pixel in the video frame. The bits that are 0 may have a first color (e.g., black), and the bits that are 1 may have a second color (e.g., white). Thus, this may allow the formation of a black and white video frame. The maximum match is saved at every scale, representing the best match to the template 860 at that scale. For example, a first video frame may have a value of 20,000 (e.g., 20,000 1 bits), and a second video frame may also have a value of 20,000 (e.g., 20,000 1 bits). The bitwise AND may compare the value of one image to the value of the other image. Here, this results in a value of 20,000 indicating a perfect match. The maximum across the scales then represents the best overall match between the edges of the template image 860 and edges of the target object 160 in the video frame.

The method then operates on the identified target object 160 within the video feed, returning a cropped image of the identified target object 160, scaled up to be approximately the same size as the template image 860. For each predefined point "n" in the template image, a small region may be defined in which the corresponding point may be found in the video frame. This small neighborhood search is done because the points on the target object 160 may be rotationally invariant. If the point best match algorithm is turned loose globally on the video frame, many false positive matches may occur.

The small neighborhood search is performed for one or more of the pre-defined points. If a match is found within the small window that is better than a certain threshold (i.e., the method is free to return from the small neighborhood search with no good matches), the pixel location is identified as a match. These matches for the points are then assembled as the set of correspondences that are given to the Perspective-n-Points software. The identified pose between the camera 120 and the target object 160 may be converted to the pose between the end effector 110 and the grasp fixture 170. The target object 160 and the pose identification algorithm then pass control over to a real-time tracking portion of the algorithm that takes the points identified, and performs optical flow analysis on subsequent video frames using the Lucas-Kanade optical flow method. The pose estimation is then repeated with the previously identified points translated globally by the estimated motion between frame n and n−1.

Figure 9A:
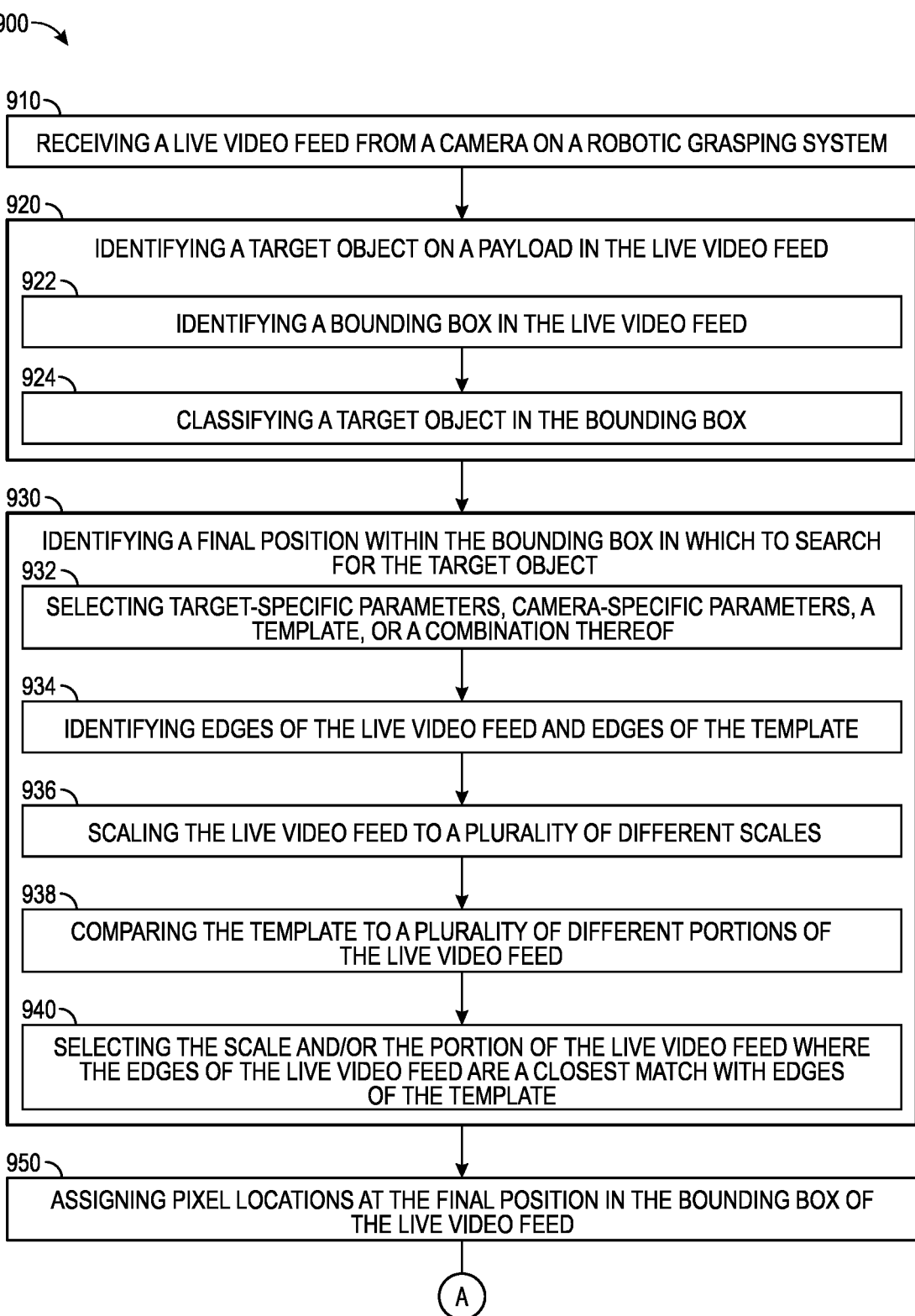
FIGS. 9A and 9B illustrate a flowchart of a method for grasping the payload using the robotic grasping system, according to an embodiment.
Figure 9B:
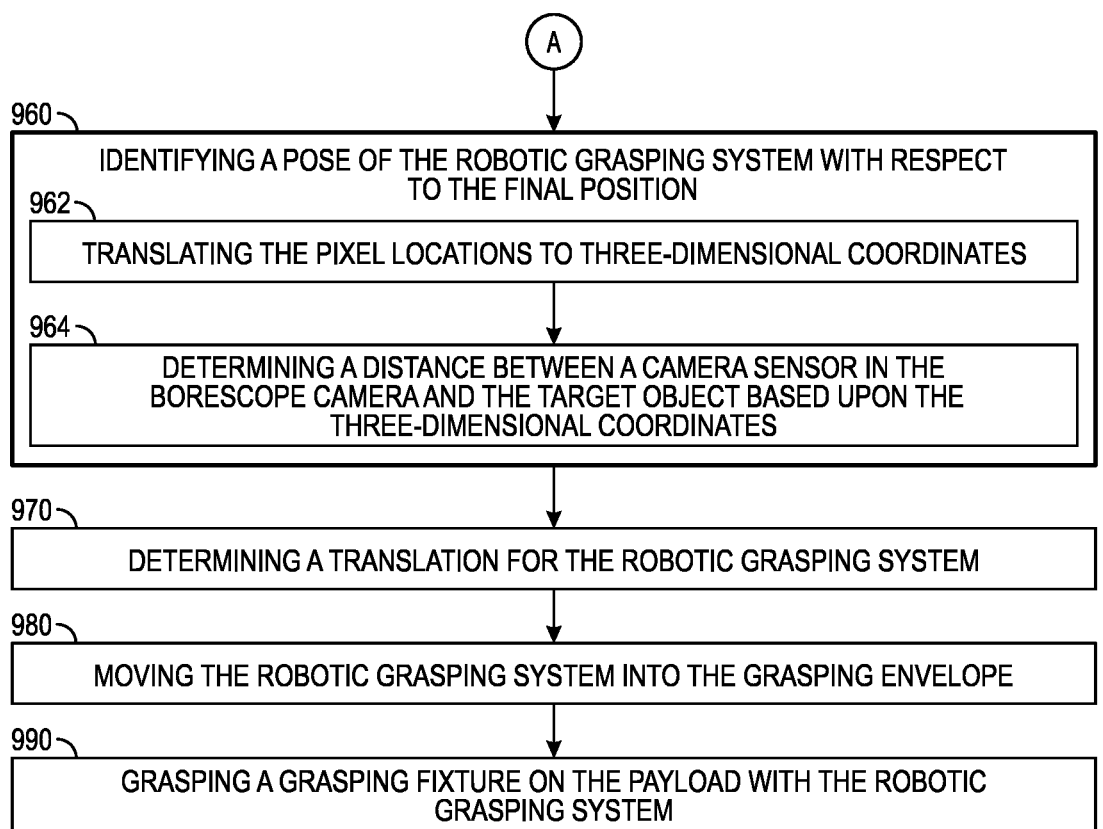

FIGS. 9A and 9B illustrate a flowchart of a method 900 for grasping the payload 150 using the robotic grasping system 100, according to an embodiment. At least a portion of the method 900 may be performed by the robotic grasping system 100 (e.g., the camera 120, the gripper mechanism 130, and/or the computing system 140). An illustrative order of the method 900 is provided below; however, one or more steps of the method 900 may be performed in a different order, combined, repeated, or omitted.

Figure 10:
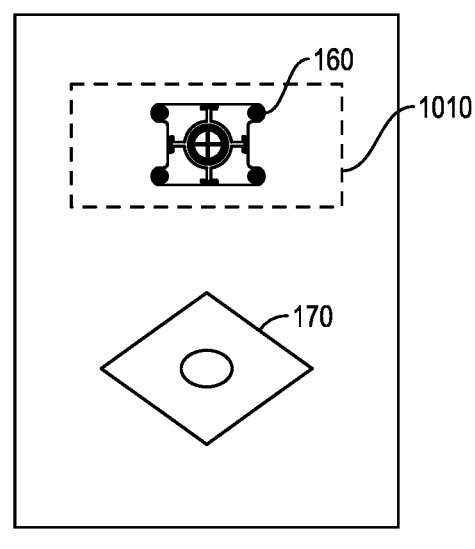
FIG. 10 illustrates a downlink view of a live video feed from a camera on the end effector, according to an embodiment.

The method 900 may include receiving a live video feed from the camera 120, as at 910. The camera 120 may be or include a borescope camera on the robotic grasping system 100 (e.g., on the end effector 110). The live video feed may be received by the computing system 140, which may be part of, or remote from, the end effector 110. FIG. 10 illustrates a downlink view of the live video feed from the camera 120, according to an embodiment. As may be seen, the downlink view may show the target object 160 and/or the grasp fixture 170.

The method 900 may also include identifying a target object 160 on a payload 150 in the live video feed, as at 920. In one embodiment, identifying the target object 160 may include identifying a bounding box 1010 in the live video feed, as at 922. This is also shown in FIG. 10. The bounding box 1010 may be identified with a first level of precision. The target object 160 may be at least partially within the bounding box 1010. Identifying the target object 160 may also include classifying the target object 160, as at 924. The target object 160 may be classified into one of a plurality of predefined classes using a single-shot multi-box detector.

The single-shot multi-box detector may be trained to identify a discrete number of classes. Examples of the classes may include grasp fixtures 170 such as dexterous handling target (DHT), truncated cone target (TCT), and modified truncated cone (MTC). When the single-shot multi-box detector receives the video frame, the detector may return a vector where each value in the vector represents a probability of the video frame containing one of the trained classes. An example vector is [5,25,60]. This means that there is a 5% chance that a target object 160 in the video frame is classified as DHT, there is a 25% chance that the target object 160 in the video frame is classified as TCT, and there is a 60% chance that the target object 160 in the video frame is classified as MTC.

The method 900 may also include identifying a (e.g., final) position within the bounding box 1010 in which to search for the target object 160, as at 930. For example, if the 50× is not selected, there is a more localized search within the bounding box. The more localized search may search for the target object 160 with a second level of precision. The second level of precision may be greater than the first level of precision.

In one embodiment, identifying the final position may include selecting target-specific parameters, camera-specific parameters, a template, or a combination thereof, as at 932. The target-specific parameters, camera-specific parameters, and/or the template may be based at least partially upon the classification of the target object 160. The target-specific parameters may include one or more points on the target object 160 (e.g., relative to a user-defined parameter). The camera-specific parameters may include a field-of-view (FOV), a center pixel, distortion, or a combination thereof. The template may include an image where the one or more points on the target object 160 are located relative to one another. The image may be from the live video feed.

Identifying the final position may also include identifying one or more edges of the live video feed and/or one or more edges of the template, as at 934. Identifying the final position may also include scaling the live video feed (e.g., up and/or down) to a plurality of different scales, as at 936. Identifying the final position may also include comparing the template to a plurality of different portions of the live video feed, as at 938. The comparison may occur at each of the different scales. Identifying the final position may also include selecting one of the scales and/or one of the portions of the live video feed based at least partially upon the edges of the live video feed and/or the edges of the template, as at 940. For example, this may include selecting the scale and/or the portion of the live video feed where the edges of the live video feed are a closest match with edges of the template. The scale and/or the portion may be used to identify the final position.

Figure 11:
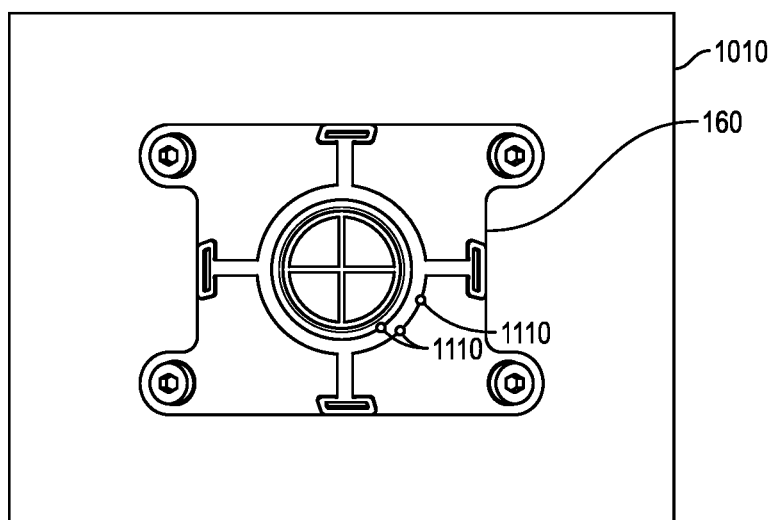
FIG. 11 illustrates an enlarged portion of FIG. 10 showing a bounding box around the target object on the payload, according to an embodiment.

The method 900 may also include assigning pixel locations at the final position in the bounding box 1010 of the live video feed, as at 950. In one embodiment, the pixel locations may be where orb features are located. FIG. 11 illustrates an enlarged portion of FIG. 10 showing the bounding box 1010, according to an embodiment. As may be seen, one or more orb features 1110 may be located on and/or around the target object 160. The orb features 1110 may be constrained within the solution box. An orb feature 1110 may be or include a gradient vector (e.g., direction and magnitude) that is rotationally invariant on the target object 160. In one embodiment, the orb features 1110 may be repeatedly detected in the same order in a video frame to address each orb 1110 by its index. This allows the corresponding features from the template image 860 to be repeatedly searched for on the target object 160 in the video frame.

The method 900 may also include identifying a pose of the robotic grasping system 100 with respect to the final position, as at 960. Identifying the pose may include translating the pixel locations to (e.g., three-dimensional) coordinates, as at 962. Identifying the pose may also include determining a distance between a camera sensor in the borescope camera 120 and the target object 160, as at 964. The determination may be based upon the three-dimensional coordinates.

The method 900 may also include determining a translation for the robotic grasping system 100, as at 970. The translation may move the robotic grasping system 100 from the final position into a grasping envelope that is in alignment with the target object 160. The bottom of FIG. 10 shows an overlay displaying the transition (e.g., X, Y, Z) to move into the grasp envelope. The translation may be based at least partially upon the pose. The translation may be less than or equal to the distance (e.g., between the camera sensor in the borescope camera 120 and the target object 160). The translation may be in a direction that is an inverse of the three-dimensional coordinates.

The method 900 may also include moving the robotic grasping system 100 into the grasping envelope, as at 980. The movement may be based at least partially upon the translation. The movement may be controlled by the computing system 140 and/or a user. For example, the user (e.g., an astronaut) may manipulate an input device (e.g., a joystick) to move the robotic grasping system 100. The astronaut may be on a spaceship or on the ISS.

The method 900 may also include grasping a grasping fixture 170 on the payload 150 with the robotic grasping system 100, as at 990. More particularly, the gripper jaws 130 of the robotic grasping system 100 may grasp the grasping fixture 170 on the payload 150. The grasping fixture 170 may be positioned below the target object 160.

Figure 12:
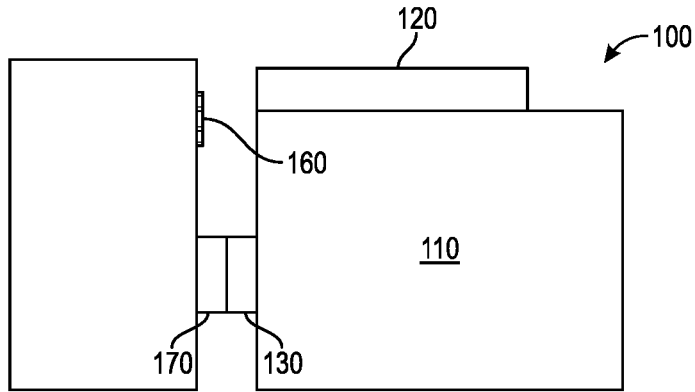
FIG. 12 illustrates a side view of the robotic grasping system grasping the payload, according to an embodiment.

FIG. 12 illustrates a side view of the robotic grasping system 100 grasping the payload 150, according to an embodiment. More particularly, FIG. 12 shows the gripper jaws 130 aligned with and grasping the grasp fixture 170.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to explain the principles of the invention and its practical applications, thereby enabling others skilled in the art to utilize the various embodiments with various modifications as are suited to the particular use contemplated.

What is claimed is:

1. A robotic grasping system, comprising: an end effector; a camera coupled to the end effector and configured to capture a feed; a gripper mechanism coupled to the end effector; and a computing system configured to receive the feed from the camera and to perform operations based at least partially upon the feed, the operations comprising:

identifying a target object on a payload in the feed;

identifying and bounding the target object to a first level of precision within a bounding box in the feed using a Region-Based Convolutional Neural Network;

after identifying the target object to the first level of precision, identifying the target object to a second level of precision using a keypoint detection algorithm to perform a localized search within the bounding box to determine a final position of the target object by detecting features of the target object in the bounding box of the feed, wherein the final position of the target object is determined using the detected features of the target object in the bounding box;

assigning pixel locations of the final position of the target object in the feed;

identifying a pose of the end effector with respect to the final position of the target object based at least partially upon the pixel locations, wherein identifying the pose comprises:

translating the final position of the target object in the feed to three-dimensional coordinates based upon the pixel locations of the final position of the target, and determining a distance between a camera sensor in the camera and the target object based upon the three-dimensional coordinates;

determining a translation to move the end effector to a grasping envelope that is in alignment with the target object, wherein the translation is based upon the pose, wherein the translation is less than or equal to the distance, and wherein the translation is in a direction that is an inverse of the three-dimensional coordinates;

moving the end effector into the grasping envelope based upon the translation; and grasping a grasping fixture on the payload with the gripper mechanism when the end effector is in the grasping envelope.

2. The robotic grasping system of claim 1, wherein identifying the final position of the target object further comprises:

selecting target-specific parameters, camera-specific parameters, and a template based upon a classification of the target object, wherein the target-specific parameters comprise one or more points on the target object, wherein the camera-specific parameters comprise a field-of-view (FOV), a center pixel, distortion, or a combination thereof, and wherein the template comprises an image where the one or more points on the target object are located relative to one another;

identifying edges of the target object in the feed and edges of the template;

scaling the feed to a plurality of different scales;

comparing the template to a plurality of different portions of the feed at each of the plurality of different scales, wherein the edges of the template are compared to the edges of the target object in each of the plurality of different scales to determine a match for each of one of the plurality of different scales, and wherein the plurality of matches includes a closest match with the edges of the template and the edges of the target object in each of the plurality of different scales; and selecting a selected scale from the plurality of different scales and a selected portion from the plurality of different portions of the feed where the edges of the target object of the selected portion of the feed are the closest match with edges of the template, wherein the selected scale and the selected portion of the feed are used to identify the final position of the target object.

3. The robotic grasping system of claim 1, wherein the operations further comprise classifying the target object using a single-shot multi-box detector.

4. The robotic grasping system of claim 3, wherein classifying the target object comprises generating a vector including a first value and a second value, wherein the first value indicates a likelihood that the target object is in a first class, and wherein the second value indicates a likelihood that the target object in a second class, wherein the first level of precision is based on the vector, and wherein the second level of precision is greater than the first level of precision.

5. The robotic grasping system of claim 1, wherein the target object is identified using a first watch function when a distance from the target object is greater than a predetermined distance and where the first watch function uses the Region-Based Convolutional Neural Network, wherein the target object is identified using a second watch function when the distance is less than the predetermined distance and where the second watch function is based on a template match search.

6. A method, comprising:

receiving a feed from a camera on a robotic grasping system; identifying a target object on a payload in the feed;

identifying and bounding a target object to a first level of precision within a bounding box in the feed using a Region-Based Convolutional Neural Network;

after identifying the target object to the first level of precision, identifying the target object to a second level of precision using a keypoint detection algorithm to perform a localized search within the bounding box to determine a final position of the target object by detecting features of the target object in the bounding box of the feed, wherein the final position of the target object is determined using the detected features of the target object in the bounding box;

assigning pixel locations of the final position of the target object in the bounding box of the feed;

identifying a pose of the robotic grasping system with respect to the final position of the target object based at least partially upon the pixel locations, wherein identifying the pose comprises:

translating the final position of the target object in the feed to three-dimensional coordinates based upon the pixel locations of the final position of the target, and determining a distance between a camera sensor in the camera and the target object based upon the three-dimensional coordinates;

determining a translation for the robotic grasping system to move the robotic grasping system to a grasping envelope that is in alignment with the target object, wherein the translation is based upon the pose, wherein the translation is less than or equal to the distance, and wherein the translation is in a direction that is an inverse of the three-dimensional coordinates;

moving the robotic grasping system into the grasping envelope based upon the translation; and grasping a grasping fixture on the payload with the robotic grasping system.

7. The method of claim 6, wherein identifying the target object comprises:

classifying the target object using a single-shot multi-box detector.

8. The method of claim 6, wherein identifying the final position of the target object further comprises:

selecting target-specific parameters, camera-specific parameters, and a template based upon a classification of the target object, wherein the target-specific parameters comprise one or more points on the target object, wherein the camera-specific parameters comprise a field-of-view (POV), a center pixel, distortion, or a combination thereof, and wherein the template comprises an image where the one or more points on the target object are located relative to one another;

identifying edges of the target object in the feed and edges of the template;

scaling the feed to a plurality of different scales;

comparing the template to a plurality of different portions of the feed at each of the plurality of different scales, wherein the edges of the template are compared to the edges of the target object in each of the plurality of different scales to determine a plurality of matches for the plurality of different scales, and wherein the plurality of matches includes a closest match with the edges of the template and the edges of the target object in each of the plurality of different scales; and selecting a selected scale from the plurality of different scales and a selected portion from the plurality of different portions of the feed where the edges of the selected portion of the feed are the closest match with edges of the template, wherein the selected scale and the selected portion are used to identify the final position of the target.

9. A method for grasping a payload with a robotic grasping system, the method comprising:

receiving a live video feed from a borescope camera on the robotic grasping system;

identifying a target object on the payload in the live video feed, wherein identifying the target object comprises:

identifying a bounding box in the live video feed with a first level of precision using a Region-Based Convolutional Neural Network, wherein the target object is within the bounding box; and classifying the target object using a single-shot multi-box detector, wherein classifying the target object comprises generating a vector including a first value, wherein the first value indicates a likelihood that the target object is in a first class, and wherein the first level of precision is based on the vector;

after identifying the target object to the first level of precision, identifying the target object to a second level of precision using a keypoint detection algorithm to perform a localized search within the bounding box to determine a final position of the target object by detecting features of the target object within the bounding box of the feed, wherein the final position of the target object is determined using the detected features of the target object in the bounding box, wherein the second level of precision is greater than the first level of precision, wherein identifying the final position of the target object further comprises:

selecting target-specific parameters, camera-specific parameters, and a template based upon the classification of the target object, wherein the target-specific parameters comprise one or more points on the target object relative to a user-defined parameter, wherein the camera-specific parameters comprise a field-ofview (POV), a center pixel, distortion, or a combination thereof, and wherein the template comprises an image where the one or more points on the target object are located relative to one another;

identifying edges of the target object of the live video feed and edges of the template;

scaling the live video feed to a plurality of different scales;

comparing the template to a plurality of different portions of the live video feed at each of the plurality of different scales, wherein the edges of the template are compared to the edges of the target object in each of the plurality of different scales to determine a match for each of one of the plurality of different scales, and wherein the plurality of matches includes a closest match with the edges of the template and the edges of the target object in each of the plurality of different scales; and selecting a selected scale from the plurality of different scales and a selected portion from the plurality of different portions of the live video feed where the edges of the live video feed are closest match with edges of the template, wherein the selected scale and the selected portion are used to identify the final position;

assigning pixel locations of the final position of the target object in the bounding box of the live video feed;

identifying a pose of the robotic grasping system with respect to the final position of the target object, wherein identifying the pose comprises:

translating the pixel locations to three-dimensional coordinates based upon the pixel locations of the final position of the target; and determining a distance between a camera sensor in the borescope camera and the target object based upon the three-dimensional coordinates;

determining a translation for the robotic grasping system to move the robotic grasping system to a grasping envelope that is in alignment with the target object, wherein the translation is based upon the pose, wherein the translation is determined with a certainty that is greater than a predetermined threshold, wherein the translation is less than or equal to the distance, and wherein the translation is in a direction that is an inverse of the three-dimensional coordinates;

moving the robotic grasping system into the grasping envelope based upon the translation; and grasping a grasping fixture on the payload with the robotic grasping system, wherein the grasping fixture is positioned below the target object.

10. The method of claim 9, wherein each of the different scales comprises the bounding box having a different lower bound and a different upper bound.

11. The method of claim 9, wherein identifying the final position comprises using a finer localization algorithm to search for the target object within the bounding box with the second level of precision.

12. The method of claim 9, wherein assigning the pixel locations of the features comprises selecting only the features in the bounding box that match corresponding features and neighborhood pixels in the template.

13. The method of claim 9, wherein the pixel locations of the features are assigned in response to the final position being positioned within the bounding box and not being null.

* * * * *